(12) United States Patent
Müller

(10) Patent No.: US 7,717,127 B2
(45) Date of Patent: May 18, 2010

(54) DIAPHRAGM VALVE

(75) Inventor: Fritz Müller, Ingelfingen (DE)

(73) Assignee: GEMÜ Gebrüder Müller Apparatebau GmbH & Co. KG, Ingelfingen (DE)

( * ) Notice: Subject to any disclaimer, the term of this patent is extended or adjusted under 35 U.S.C. 154(b) by 0 days.

(21) Appl. No.: 11/350,586

(22) Filed: Feb. 8, 2006

(65) Prior Publication Data
US 2006/0174949 A1 Aug. 10, 2006

(30) Foreign Application Priority Data
Feb. 10, 2005 (DE) ............ 20 2005 002 152 U

(51) Int. Cl.
F16K 37/00 (2006.01)

(52) U.S. Cl. ............ 137/557; 251/331; 251/367

(58) Field of Classification Search ............ 137/554; 251/331, 367
See application file for complete search history.

(56) References Cited

U.S. PATENT DOCUMENTS

| | | | |
|---|---|---|---|
| 2,054,340 A * | 9/1936 | Saunders | 251/331 |
| 2,186,833 A | 1/1940 | Iler | |
| 2,725,211 A * | 11/1955 | Boteler | 251/77 |
| 3,011,758 A | 12/1961 | McFarland | |
| 3,091,427 A * | 5/1963 | Boteler | 251/77 |
| 3,310,282 A * | 3/1967 | Boteler | 251/331 |
| 4,340,086 A * | 7/1982 | Hemm et al. | 137/554 |
| 4,901,751 A * | 2/1990 | Story et al. | 137/312 |
| 4,944,487 A * | 7/1990 | Holtermann | 251/129.17 |
| 5,771,926 A * | 6/1998 | Medal et al. | 137/554 |
| 6,095,484 A * | 8/2000 | Frenkel | 251/61.1 |
| 6,508,266 B2 * | 1/2003 | Iritani et al. | 137/312 |
| 6,889,706 B2 * | 5/2005 | Fukano et al. | 137/487.5 |
| 2002/0002999 A1 * | 1/2002 | Fukano et al. | 137/554 |

FOREIGN PATENT DOCUMENTS

| | | |
|---|---|---|
| DE | 10146934 A1 | 4/2003 |
| DE | 10246912 B3 | 5/2004 |
| EP | 1138989 A | 1/2001 |
| GB | 657324 A | 9/1951 |

* cited by examiner

Primary Examiner—John K Fristoe, Jr
Assistant Examiner—Andrew J Rost
(74) Attorney, Agent, or Firm—Henry M. Feiereisen; Ursula B. Day

(57) ABSTRACT

A diaphragm valve includes a valve body and a compressor which is actuatable by a valve stem for operating a diaphragm and has an outer circumference which is formed with at least one axial groove. The compressor is guided by an intermediate piece in axial direction and restrained by the intermediate piece against rotation. The intermediate piece has an inside wall which is formed with at least one axial guide nose for engagement in the groove of the compressor.

14 Claims, 2 Drawing Sheets

DIAPHRAGM VALVE

CROSS-REFERENCES TO RELATED APPLICATIONS

This application claims the priority of German Patent Application, Ser. No. 20 2005 002 152.0, filed Feb. 10, 2005, pursuant to 35 U.S.C. 119(a)–(d), the content of which is incorporated herein by reference.

BACKGROUND OF THE INVENTION

The present invention relates, in general, to a diaphragm valve for liquid and/or gaseous fluids.

Nothing in the following discussion of the state of the art is to be construed as an admission of prior art.

A diaphragm valve of a type involved here includes a valve body, a compressor which can be actuated by a valve stem for operating a diaphragm. The compressor is guided by an intermediate piece in axial direction and restrained by the intermediate piece against rotation. The compressor has two guide lands which radially jut out from the otherwise circular circumference of the compressor, for guidance in respective grooves in the wall of an intermediate piece of the diaphragm valve. The wall of the intermediate piece is reinforced radially outwards in the area of the grooves, thereby creating necessarily bulges or ribs about the otherwise cylindrical outer circumference of the intermediate piece. The presence of such bulges or rib renders the required cleaning operation of the intermediate piece, especially when sterile valves are involved, complicated. A further drawback of this type of diaphragm valve is the absence of any pressure that can be applied onto the diaphragm and the valve body in the area of the grooves in the intermediate piece for guiding the compressor. The presence of the grooves also results in a breach in the application of a contact pressure, so that the fluid-tightness of this type of diaphragm valve cannot be ensured in this area, and there is also an added risk that the diaphragm becomes damaged by the radially outwardly projecting lands on the compressor.

It would therefore be desirable and advantageous to provide an improved diaphragm valve to obviate prior art shortcomings.

SUMMARY OF THE INVENTION

According to one aspect of the present invention, a diaphragm valve includes a valve body, a compressor actuatable by a valve stem for operating a diaphragm, with the compressor having an outer circumference formed with at least one axial groove, and an intermediate piece for guiding the compressor in axial direction and restraining the compressor against rotation, with the intermediate piece having an inside wall formed with at least one axial guide nose for engagement in the groove of the compressor.

The present invention resolves prior art problems by incorporating the grooves in the compressor and the guide noses in the inner wall of the intermediate piece. As a result, the intermediate piece has a smooth, cylindrical outer surface area. In addition, the compressor is able to apply the contact pressure evenly across the entire circumference, when the diaphragm valve closes. Thus, fluid-tightness is significantly improved.

According to another feature of the present invention, the compressor may have two grooves, and the intermediate piece has two guide noses which are disposed diametrically opposite to one another.

According to another feature of the present invention, the grooves and the guide noses area are disposed at 45° offset in relation to the sealing lands of the valve body and the compressor, respectively.

According to another feature of the present invention, the intermediate piece may be provided with threaded bores for attachment of sensors, e.g. electric position indicators or proximity switches. The arrangement of such sensors on the outer wall of the intermediate piece is possible as a consequence of the 45° offset disposition of the grooves and guide noses relative to the sealing lands. The sensors can be attached to the outer wall of the intermediate piece in a direction of the sealing lands or transversely thereto.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 3:
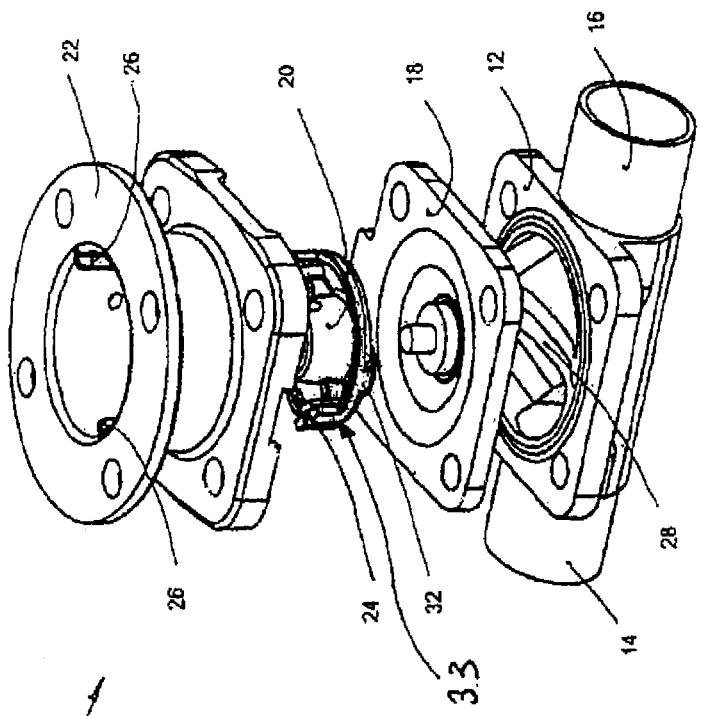
FIG. 3 is an exploded view of the diaphragm valve of FIG. 1.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
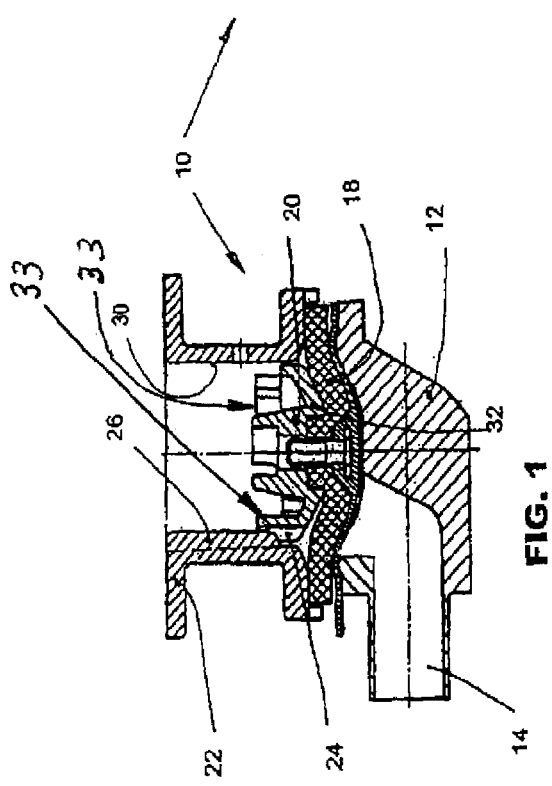
FIG. 1 is a sectional view of part of a diaphragm valve according to the present invention.

Turning now to the drawing, and in particular to FIG. 1, there is shown a sectional view of part of a diaphragm valve according to the present invention, generally designated by reference numeral 10 for use with liquid and/or gaseous fluids. For the sake of simplicity, the diaphragm valve will be described hereinafter only in connection with those parts that are necessary for the understanding of the present invention. Thus, the drive and the valve stem are not shown for example.

The diaphragm valve 10 includes a valve body 12 having tubular ports 14 and 16 in opposite disposition, and a sealing land 28 (FIG. 3). A diaphragm 18 is disposed between the valve body 12 and an intermediate piece 22, with the valve body 12 and the intermediate piece 22 being securely fixed to one another by unillustrated screw fasteners. The intermediate piece 22 has a substantially hollow-cylindrical configuration to define an interior space for accommodating a compressor 20 for opening and closing the diaphragm valve 10 in concert with the diaphragm 18. The compressor 20 is hereby suitably connected to the valve stem (not shown) which actuates the compressor 20 for operating the diaphragm 18.

The compressor 20 is provided with a sealing land 32 and has an outer circumference which is formed with two axial grooves 24 disposed in diametrically opposite relationship and extended in axial direction by respective axial fingers 33 which extend upright from the outer circumference of the compressor. The intermediate piece 22 has an inner wall 30 which is formed with two axial guide noses 26 disposed in diametrically opposite relationship for respective engagement in the grooves 24 of the compressor 20 and the fingers 33. As a result, the compressor 20 is guided in the intermediate piece 22 in axial direction and restrained against rotation by the engagement of the guide noses 26 in the grooves 24.

Figure 2:
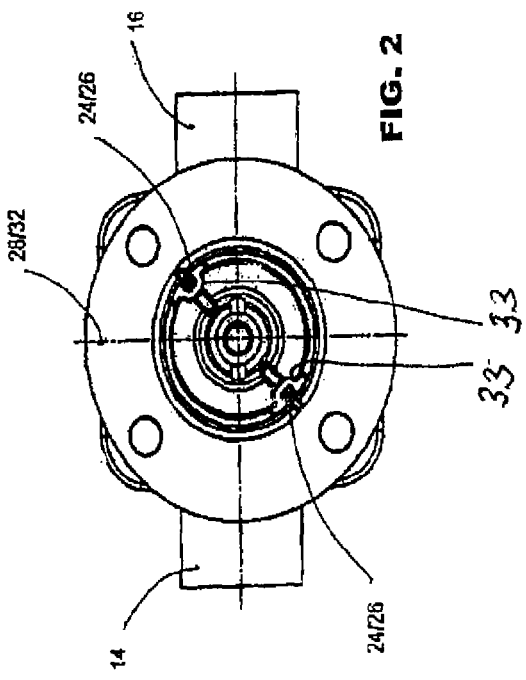
FIG. 2 is a top plan view of the diaphragm valve of FIG. 1.
Figure 5:
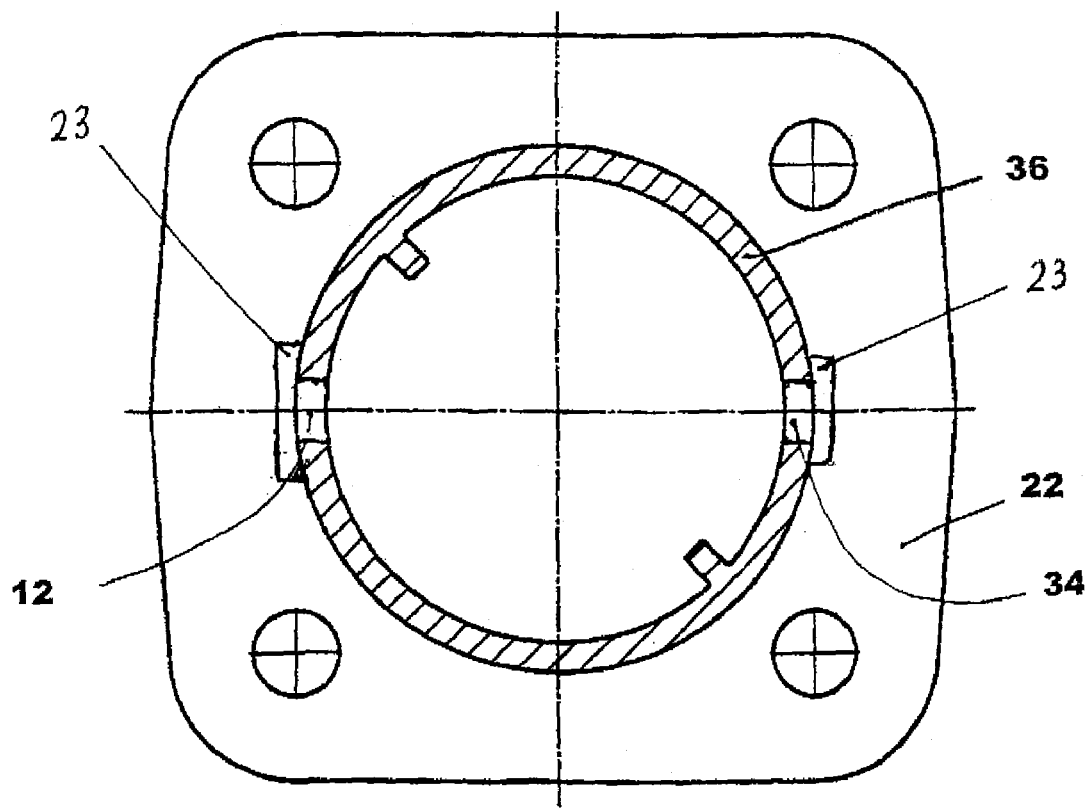
FIG. 5 is a sectional view of the intermediate piece, taken along the line A–B in FIG. 4.
Figure 4:
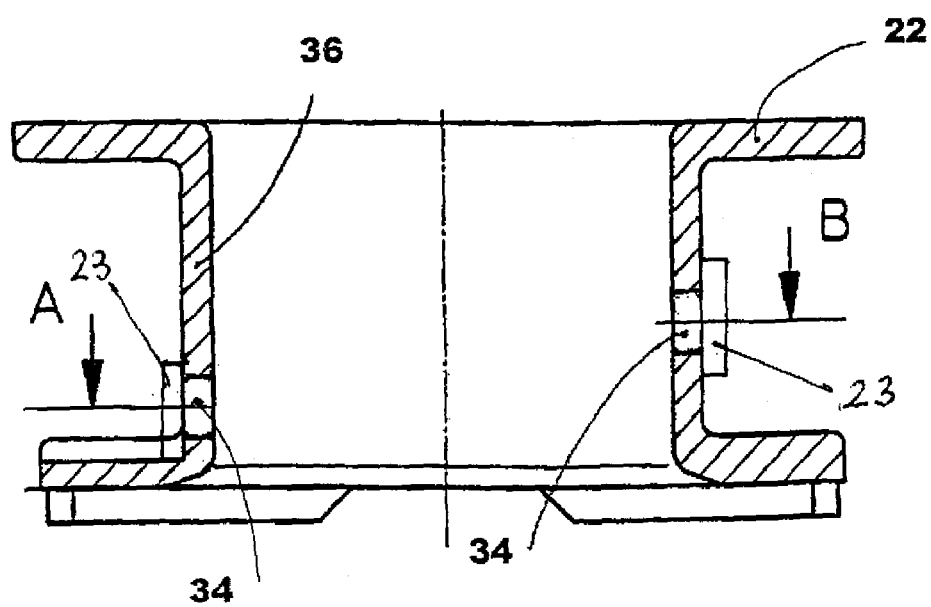
FIG. 4 is a sectional view of an intermediate piece of the diaphragm valve of FIG. 1.

As shown in FIG. 2, the grooves 24 and the guide noses 26 are arranged at a 45° offset in relation to the sealing land 28 of the valve body 12 and the sealing land 32 of the compressor 20. As a result, the intermediate piece 22 has an outer wall which can be used for attachment of sensors 23, e.g. electric position indicators or proximity switches, whereby the sensors 23 may be disposed in the direction of the sealing lands 28, 32 and/or transversely thereto. Of course, the sensors 23 may be attached in any suitable position on the outer wall of the intermediate piece 22, except in the area where the guide noses 26 are located. For attachment of the sensors 23 the cylindrical wall 36 of the intermediate piece 22 has threaded bores 34, as shown in FIGS. 4 and 5, for threaded engagement of the sensors 23.

As a consequence of the construction of the intermediate piece 22 and the compressor 20 in a manner according to the present invention, the intermediate piece 22 is provided with an even, uninterrupted cylindrical outer surface for attachment of sensors 23 in essentially any disposition. The circular configuration of the compressor 20 results in a circular abutment of the diaphragm 18 upon the intermediate piece 22, and the contact pressure can be evenly distributed upon the diaphragm 18 across the entire circumference. Also, the sealing land 32 of the compressor 20 is able to increase the particular contact pressure.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A diaphragm valve, comprising:
    a valve body;
    a compressor actuatable by a valve stem for operating a diaphragm, said compressor having an outer circumference formed with at least one axial groove and an axial finger extending from the outer circumference of the compressor in an axial direction of travel of the compressor and configured in the form of a U to extend the groove in axial direction away from the diaphragm and;
    an intermediate piece, securely fixed to the valve body, for guiding the compressor in axial direction and restraining the compressor against rotation, said intermediate piece having an inside wall, which is formed with at least one axial guide nose for engagement in the groove of the compressor and the axial finger,
    wherein the valve body and the compressor have cooperating sealing lands.

2. The diaphragm valve of claim 1, wherein the compressor has two of said groove, and the intermediate piece has two of said guide nose, said grooves and said guide noses disposed diametrically opposite to one another.

3. The diaphragm valve of claim 1, wherein the outer circumference of the compressor has a circular configuration.

4. The diaphragm valve of claim 1, wherein the groove and the guide nose are disposed at 45° offset in relation to the sealing lands of the valve body and the compressor.

5. The diaphragm valve of claim 1, wherein the intermediate piece has an outer wall, which is formed with a threaded bore at a location distal to the guide nose for attachment of a sensor.

6. The diaphragm valve of claim 5, wherein the sensor is a proximity switch or an electric position indicator.

7. The diaphragm valve of claim 5, wherein the threaded bore allows attachment of the sensor in a direction of the sealing lands.

8. The diaphragm valve of claim 5, wherein the threaded bore allows attachment of the sensor in a direction transversely to the sealing lands.

9. The diaphragm valve of claim 1, wherein the axial finger extends upright from the outer circumference of the compressor.

10. The diaphragm valve of claim 1, wherein the axial finger is configured in the form of a Ω (omega).

11. The diaphragm valve of claim 1, wherein the axial finger is configured in the shape of a radially open U.

12. The diaphragm valve of claim 1, wherein the axial finger extends from the outer circumference of the compressor in axial alignment with the outer circumference without extending beyond the outer circumference in a radial direction.

13. The diaphragm valve of claim 1, wherein the axial finger has a vertical dimension which exceeds a vertical dimension of the outer circumference.

14. A diaphragm valve, comprising:
    a valve body;
    a compressor actuatable by a valve stem for operating a diaphragm, said compressor having an outer circumference formed with at least one axial groove and a single axial finger extending in an axial direction of travel of the compressor from the outer circumference of the compressor and having a radially open U-shaped configuration to extend the groove in axial direction away from the diaphragm;
    an intermediate piece, securely fixed to the valve body, for guiding the compressor in axial direction and restraining the compressor against rotation, said intermediate piece having an inside wall, which is formed with at least one axial guide nose for engagement in the groove of the compressor and the axial finger,
    wherein the valve body and the compressor have cooperating sealing lands.

* * * * *